United States Patent [19]

Clark, Jr.

[11] 4,136,262
[45] Jan. 23, 1979

[54] TELEPHONE PAYSTATION

[75] Inventor: Robert A. Clark, Jr., Ft. Lauderdale, Fla.

[73] Assignee: Communication Equipment and Engineering Co., Melrose Park, Ill.

[21] Appl. No.: 833,511

[22] Filed: Sep. 15, 1977

[51] Int. Cl.² .................................... H04M 17/02
[52] U.S. Cl. .................................. 179/6.3 R; 179/6.5
[58] Field of Search ............... 179/6.3 A, 6.4, 6.5, 179/6.31; 194/44, 1 N, 1 M, 1 H

[56] References Cited

U.S. PATENT DOCUMENTS

| | | | |
|---|---|---|---|
| 2,921,980 | 1/1960 | Lomax | 179/6.5 |
| 3,317,674 | 5/1967 | Nawman | 179/6.3 R |
| 3,393,273 | 7/1968 | Bustos | 179/6.3 R |
| 3,760,101 | 9/1973 | Burns | 179/6.3 R |
| 3,842,210 | 10/1974 | Dawson | 179/6.3 R |
| 3,868,483 | 2/1975 | Trimmer et al. | 179/6.3 R |
| 3,881,062 | 4/1975 | Beeman et al. | 179/6.3 R |
| 4,063,036 | 12/1977 | Hunsicker | 179/6.3 R |

Primary Examiner—Kathleen H. Claffy
Assistant Examiner—Gerald L. Brigance
Attorney, Agent, or Firm—Mason, Kolemainen, Rathburn & Wyss

[57] ABSTRACT

A high security full prepay telephone paystation utilizes a low current escrow unit and a coin counter for determining the amount of money deposited in the escrow. Also, circuitry is provided for sensing whether any money at all has been deposited in the escrow. If no money has been deposited, the circuit permits dial and voice signals to pass to permit "0," "1" and certain emergency numbers, such as "911" to be passed to central offices designed to accept such numbers without the need for depositing a coin. If money is deposited, but that money is insufficient as determined by the coin counter, the dial and voice circuitry is inhibited. In addition, an improved coin box and paystation locking mechanism further improves the security of the station.

11 Claims, 16 Drawing Figures

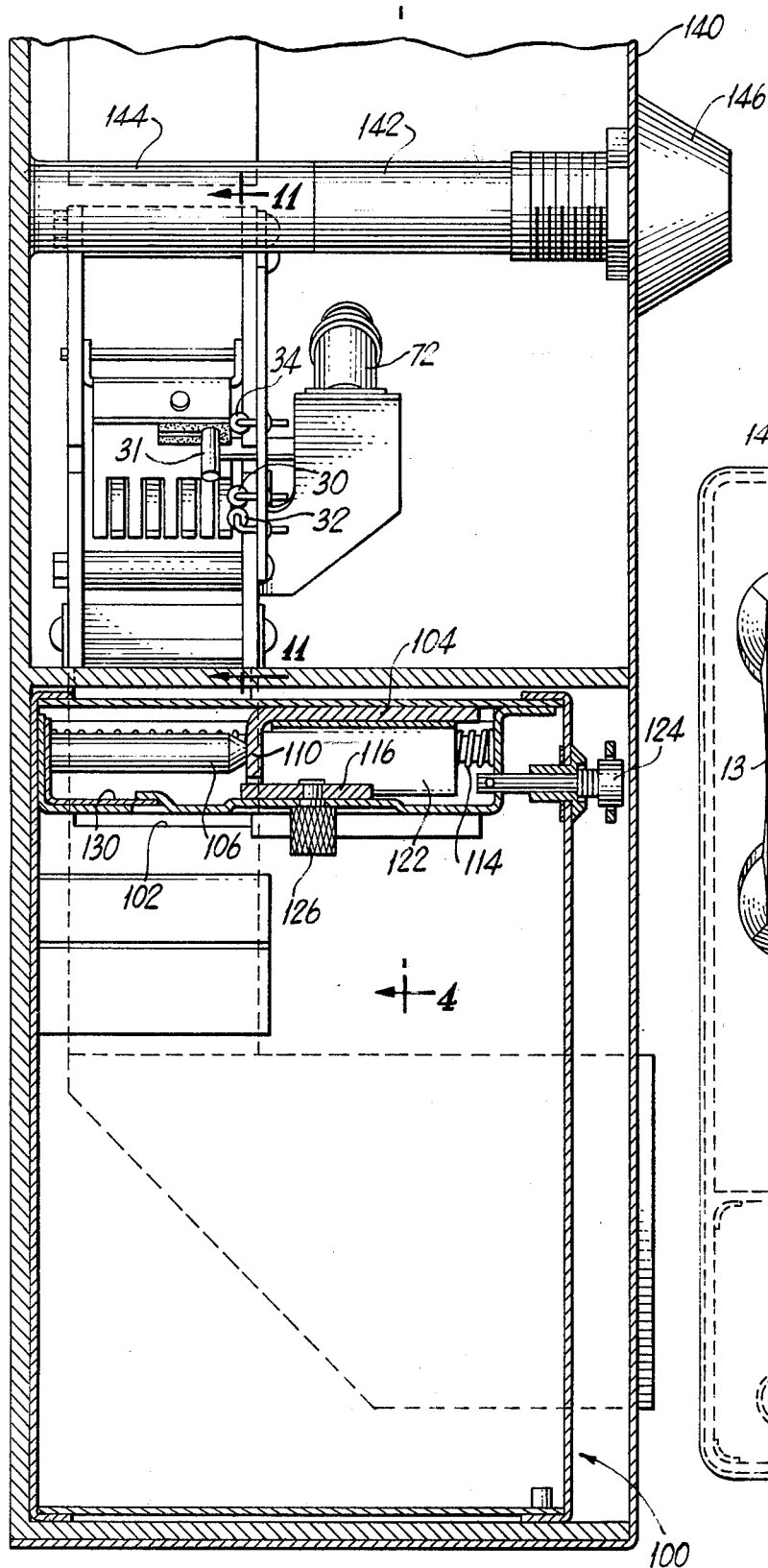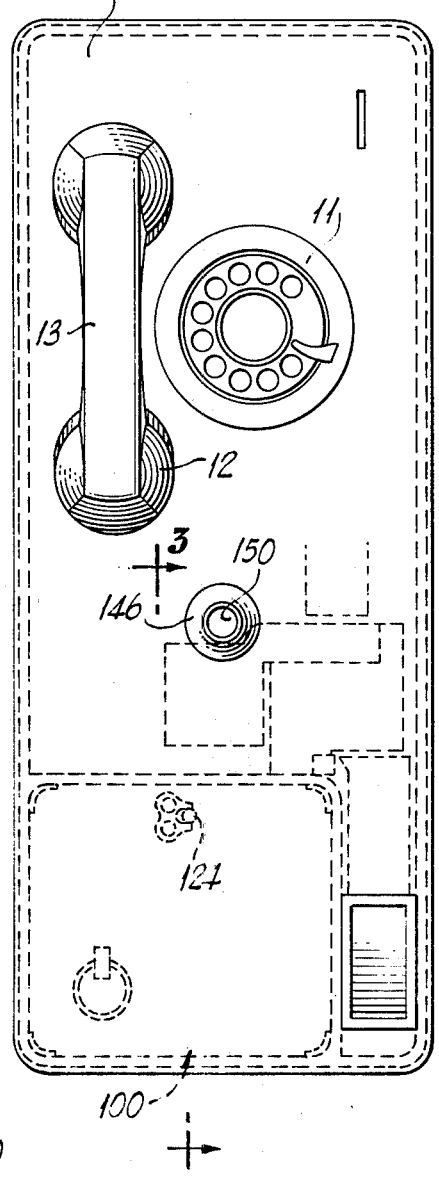

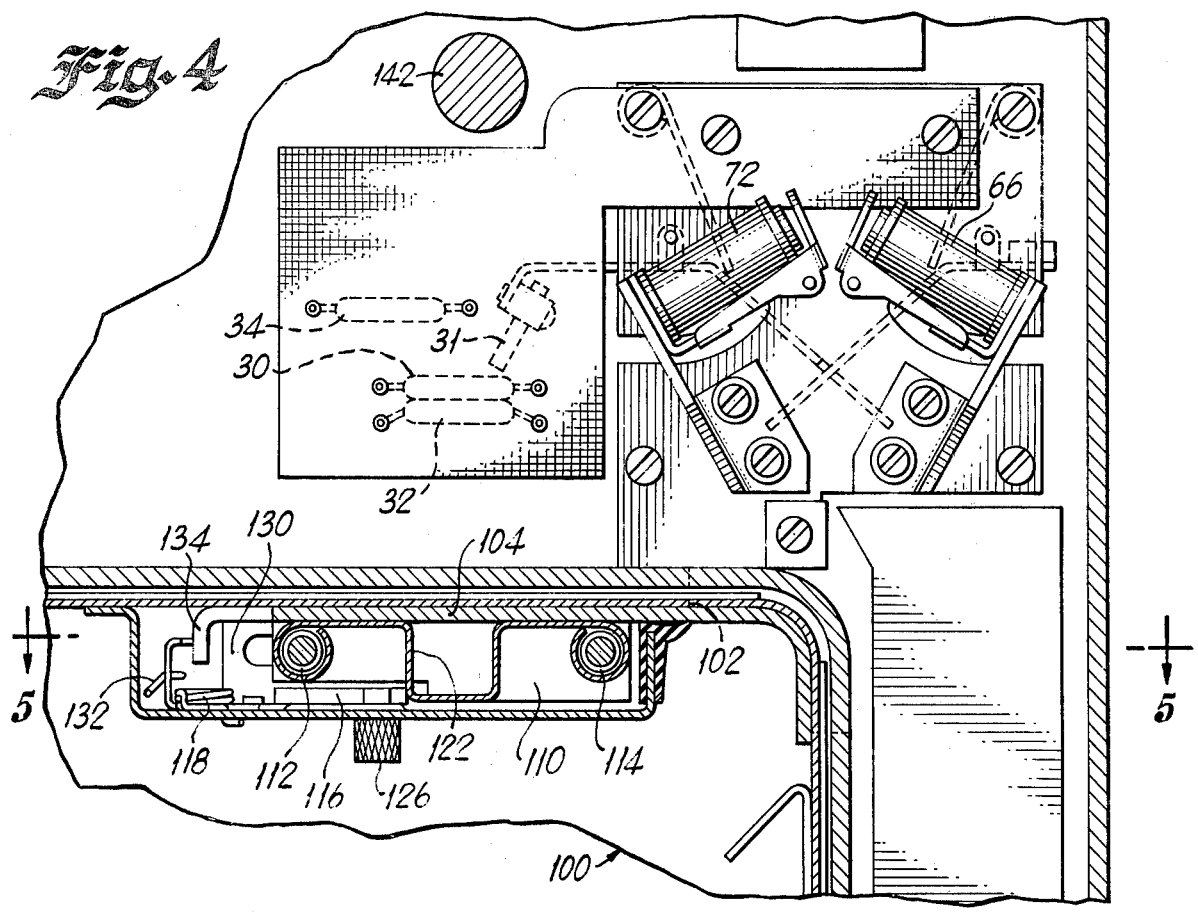
Fig. 4
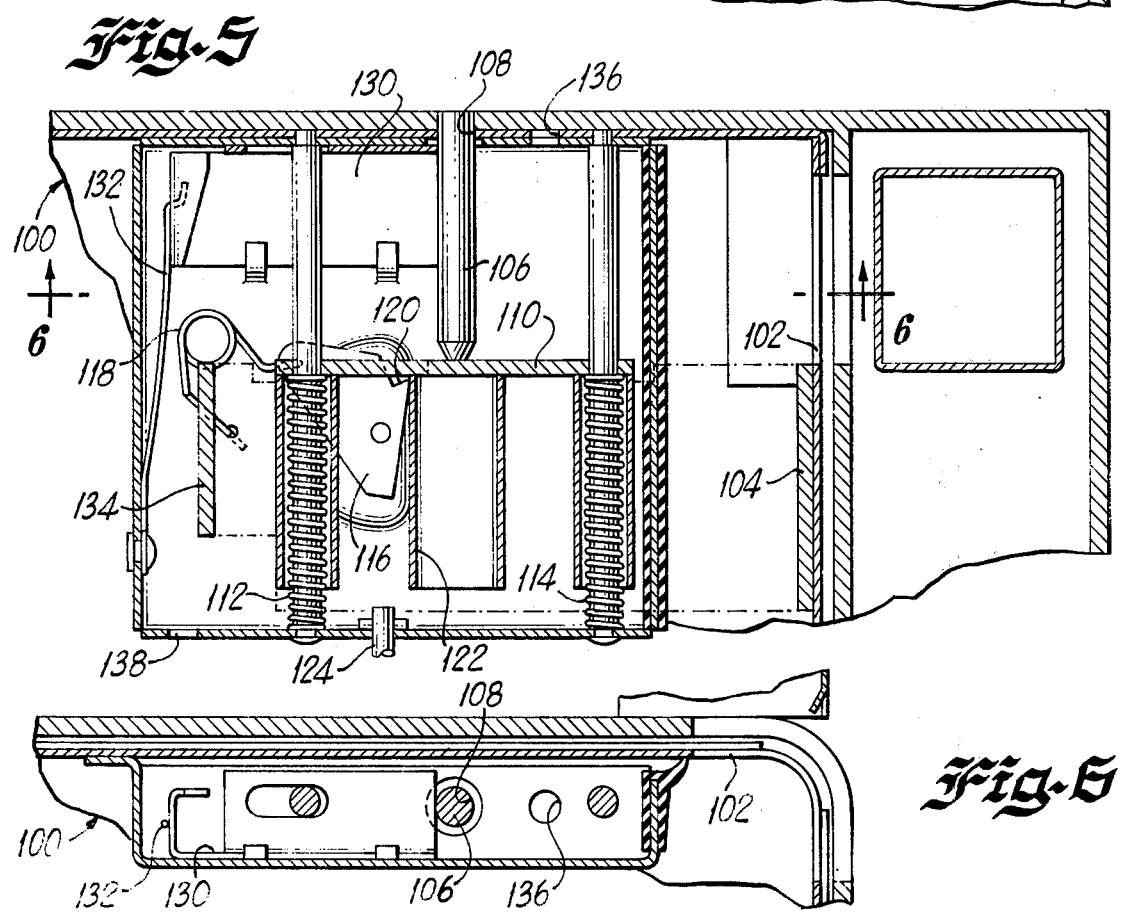
Fig. 5
Fig. 6

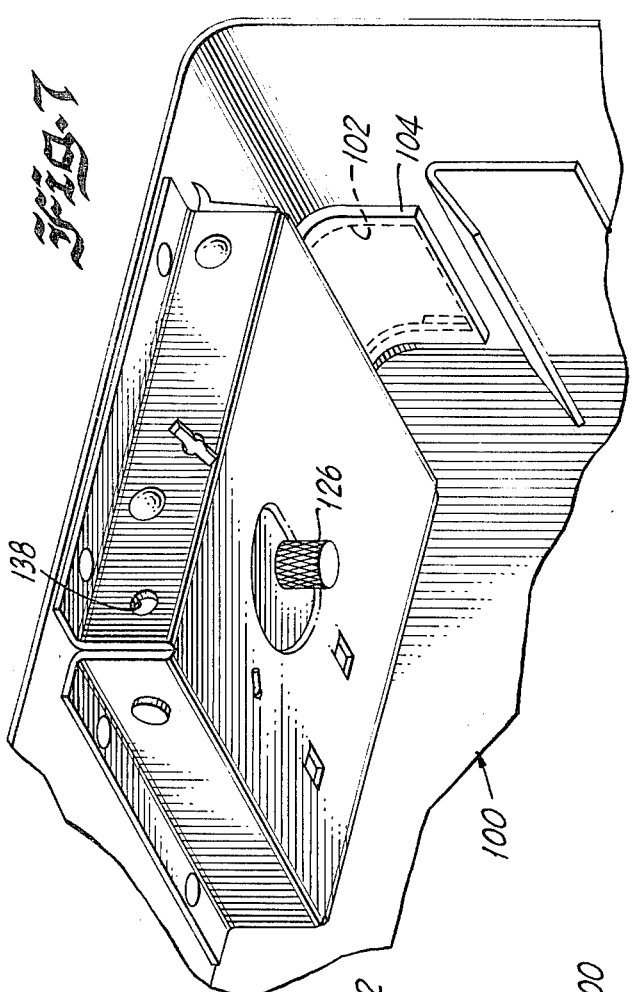
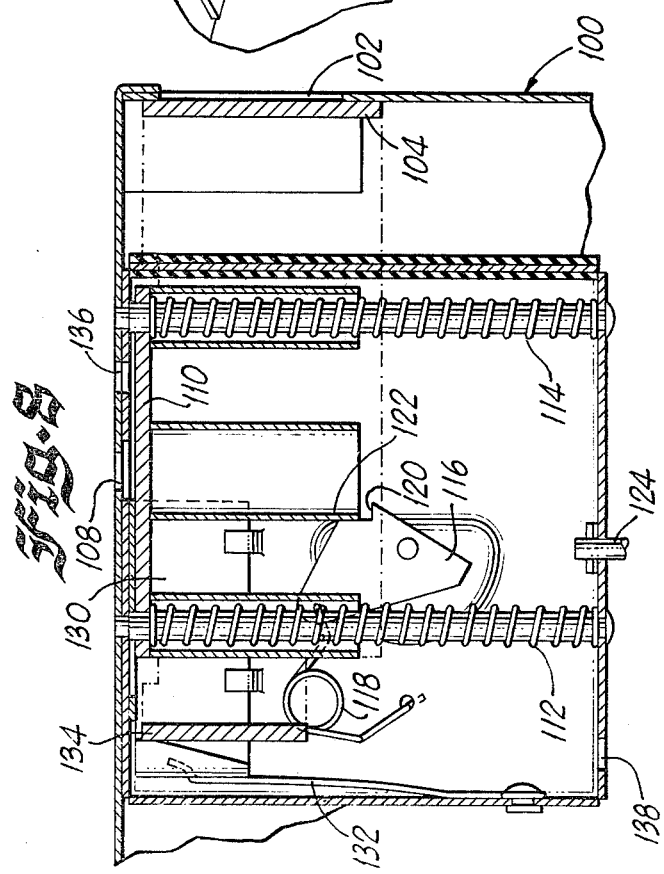
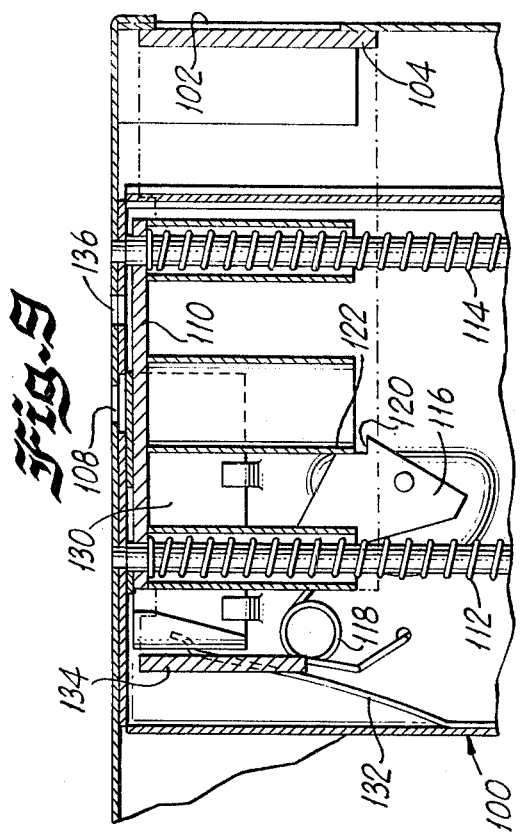
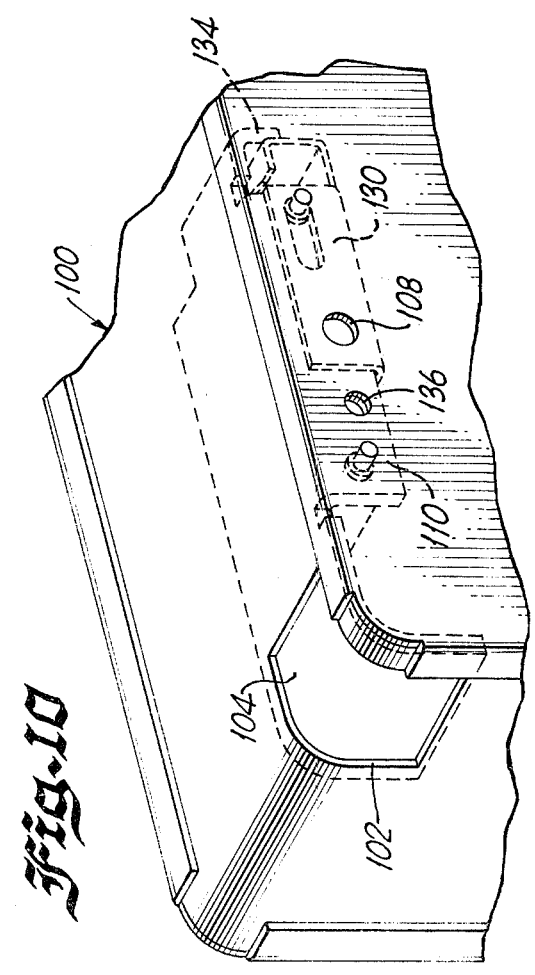

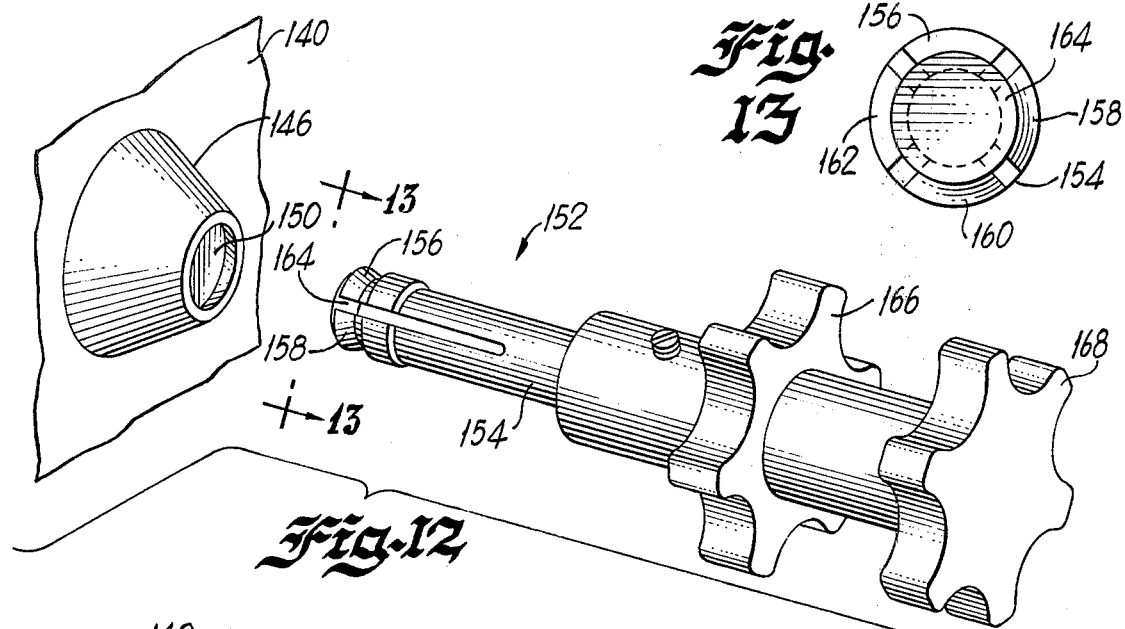
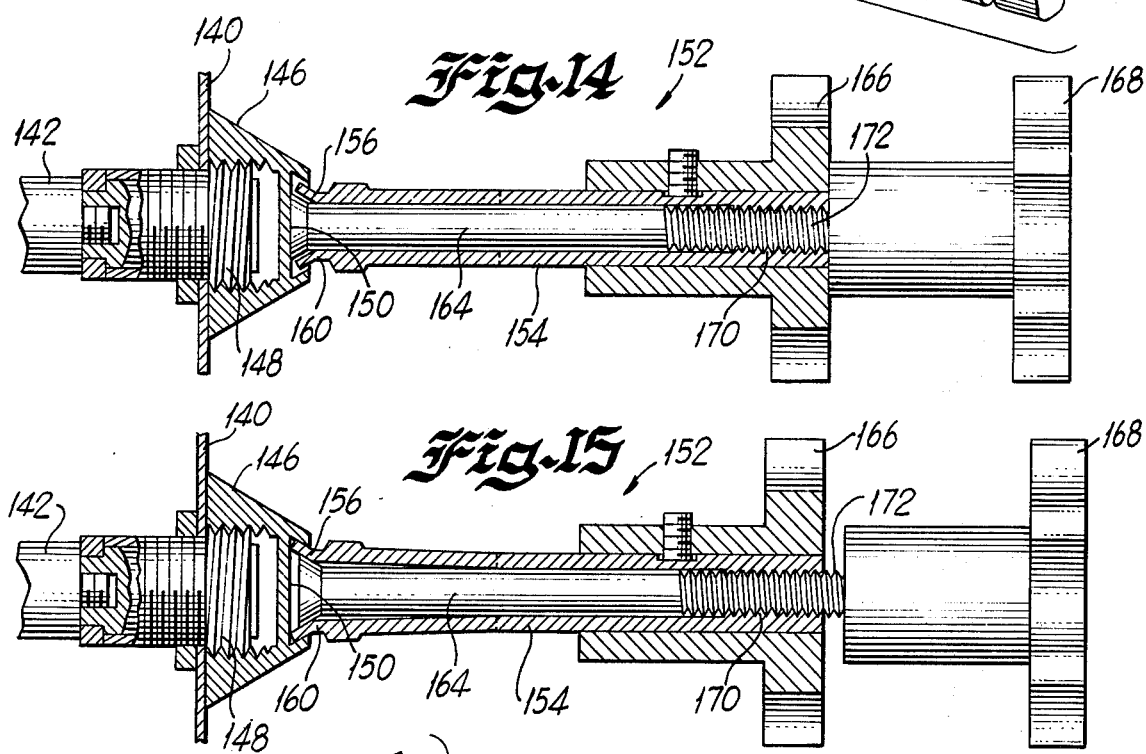
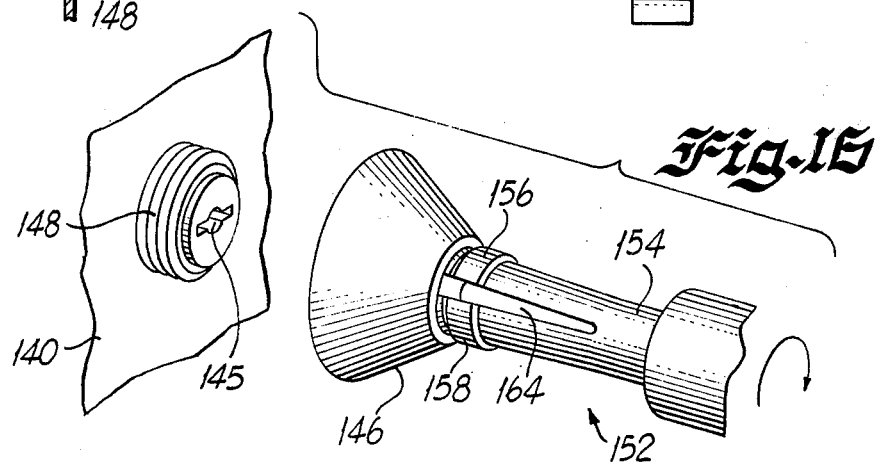

TELEPHONE PAYSTATION

BACKGROUND OF THE INVENTION

1. Field of the Invention

This invention relates generally to telephones, and more particularly, to a highly secure pay telephone system that discourages theft and cheating by providing improved coin control circuitry and a more secure coin box and locking mechanism for the telephone housing.

2. Description of the Prior Art

Presently known paystation telephones have certain problem areas. One of these problem areas concerns the coin collecting operation. Problems in the coin collecting operation sometimes cause a coin to be erroneously collected, and in other situations, to be erroneously refunded. Moreover, the coin collecting function generally requires operator attention or complex equipment at the central office.

Another source of problems is the telephone coin box. Typical telephone coin boxes employ a door which is opened as the coin box is inserted into the telephone. The open door permits coins to enter the coin box from the escrow unit or collect chute. Prior art coin boxes have been designed so that when a full coin box is removed from the telephone, the door closes automatically and cannot be reopened. Thus, coins cannot be removed from the coin box when the coin box is removed from the telephone.

While such a coin box does provide a measure of security, and reduces the number of coins stolen, the security provided by such a coin box can be defeated by manually opening the door and taping or otherwise securing it in an open position prior to inserting the coin box into the telephone. When this is done, the door remains open when the coin box is removed from the telephone. This permits a dishonest employee to remove some of the coins from the coin box, manually close the door and turn in the coin box containing the remainder of the coins without being detected.

A third problem associated with pay telephones is theft or vandalism caused by nonemployees, and although paystation telephones are continuously being made more rugged, the theft and vandalism problem persists.

SUMMARY OF THE INVENTION

Accordingly, it is an object of the present invention to provide a paystation telephone having an improved full prepay coin control circuit.

It is another object of the present invention to provide an improved coin control circuit that disables the dialing and talking circuits unless the proper amount of money is deposited.

It is still another object of the present invention to provide a paystation control circuit that permits certain types of calls to be made without depositing any money.

It is yet another object of the present invention to provide a more secure telephone paystation.

It is still another object of the present invention to provide a more theft-proof coin box than the prior art coin boxes.

It is still another object of the present invention to provide a locking mechanism for the case of the paystation telephone that is more secure and less subject to tampering than the prior art locking mechanisms.

In accordance with a preferred embodiment of the invention, an improved coin control circuit permits full prepay operation over long distance with improved coin collecting reliability. This is accomplished by providing a circuit that senses whether or not any coins have been deposited in the escrow unit. If no coins have been deposited, dial and voice signals are passed to the central office to permit certain classes of calls, such as operator assistance and emergency calls, to be made. If no coins are deposited, the line current remains balanced, thus indicating to the central office that no coins have been deposited, and causes the central office to reject calls other than those specifically allowed. The deposit of a coin into the escrow unit causes the circuitry to unbalance the line current to indicate to the central office that coins have been deposited. At the same time, the circuitry inhibits the dialing and talking circuits to prevent voice and dialing signals from being applied to the telephone line unless the proper amount of money, as determined by a coin counting circuit, has been deposited. In such an instance, the coin counting circuit overrides the action of the inhibiting circuit and permits the dial and voice signals to pass when the proper amount of money has been deposited.

In addition, an improved security coin box which significantly reduces the possibility of theft by employees is provided. The improved coin box includes a door mechanism that prevents the insertion of the coin box into the telephone if the door of the coin box had previously been manually opened. A flag also notifies the bank or central agency processing the coins that the coin box has been tampered with. Finally, an improved tamper-proof cover is provided over the telephone vault locking keyhole to further reduce tampering.

These and other objects and advantages of the present invention will be readily apparent upon consideration of the following detailed description and attached drawing wherein:

FIG. 1 is a front view of a telephone paystation according to the present invention;

FIG. 3 is a side sectional view of the paystation taken along line 3—3 of FIG. 1;

FIG. 4 is a partial sectional view of the paystation taken along line 4—4 of FIG. 3 showing the escrow unit, the coin sensing circuitry and a portion of the improved coin box;

FIG. 5 is a partial sectional view of the paystation taken along line 5—5 of FIG. 4 showing the installation of the coin box in the paystation;

FIG. 6 is a partial sectional view taken along line 6—6 of FIG. 5 showing details of the coin box door closing mechanism;

FIG. 7 is a partial perspective view of the inside of the coin box according to the invention showing the door and door control mechanism;

FIG. 8 is a top sectional view of the door closing mechanism showing the position of the components when the door has not been tampered with;

FIG. 9 is a sectional view similar to FIG. 8 showing the position of the components when the door has been tampered with;

FIG. 10 is a partial perspective view of the coin box and door;

FIG. 12 is a perspective view of the lock cover of the improved locking mechanism according to the invention and the tool for removing the cover;

FIG. 13 is an end view of the tool taken along line 13—13 of FIG. 12;

FIG. 14 is a side sectional view of the tool and cover showing the tool as it is inserted into the cover;

FIG. 15 is a side sectional view similar to that of FIG. 14 showing the tool engaging the cover prior to removal of the cover; and FIG. 16 is a partial perspective view showing the cover after it has been removed by the tool.

DETAILED DESCRIPTION OF THE PREFERRED EMBODIMENT

Figure 2:
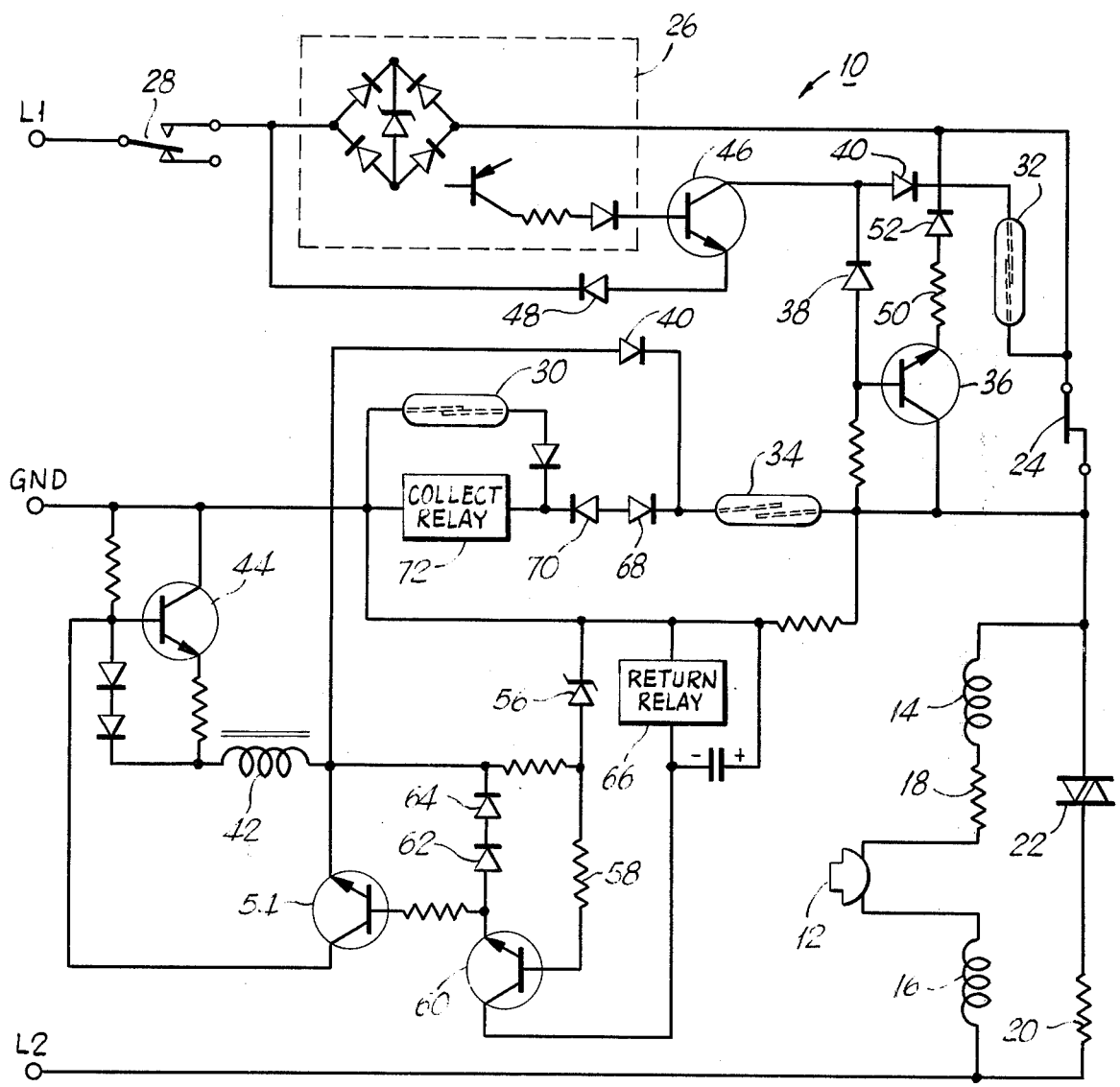
FIG. 2 is a circuit diagram of the coin control circuit employed in the paystation according to the present invention.

Referring now to the drawings, with particular attention to FIG. 1, a telephone paystation generally designated by the reference numeral 10 includes a dial 11 and a handset 13 having a transmitter 12 and a receiver. A transmission network including inductors 14 and 16, resistors 18 and 20 and the voltage variable resistor 22 (FIG. 2) are contained within the paystation 10. The transmitter 12 and the transmission network are connected in series with a dial signal producing circuit, in this embodiment a set of dial pulse producing contacts 24, and the lines L1 (ring) and L2 (tip), with the connection to the line L1 being made through a coin tone generator 26 and a hook switch 28. A coin tone generator suitable as the generator is manufactured by Communications Equipment and Engineering Company, and a push button tone generating dial may be used in place of the rotary dial 11 and the contacts 24.

When the handset 13 is lifted off hook, the hook switch 28 is closed. If no coins have yet been deposited into the escrow unit, a pair of reed switches 30 and 32 are maintained in a closed position by a magnet 31 (FIG. 4) within a coin escrow unit, and a reed switch 34 is maintained in an open position. The reed switch 32 connects the base of a transistor 36 to the line L1 through a pair of diodes 38 and 40. This maintains the transistor 36 nonconductive and permits dial pulses from the dial pulse contacts 24 to be passed through to the lines L1 and L2 to permit emergency calls to be made without a coin being deposited if the central office is equipped to accept such emergency calls. In such a system, calls other than emergency calls or access to an operator will be rejected by circuitry within the central office if no coins are deposited.

Figure 11:
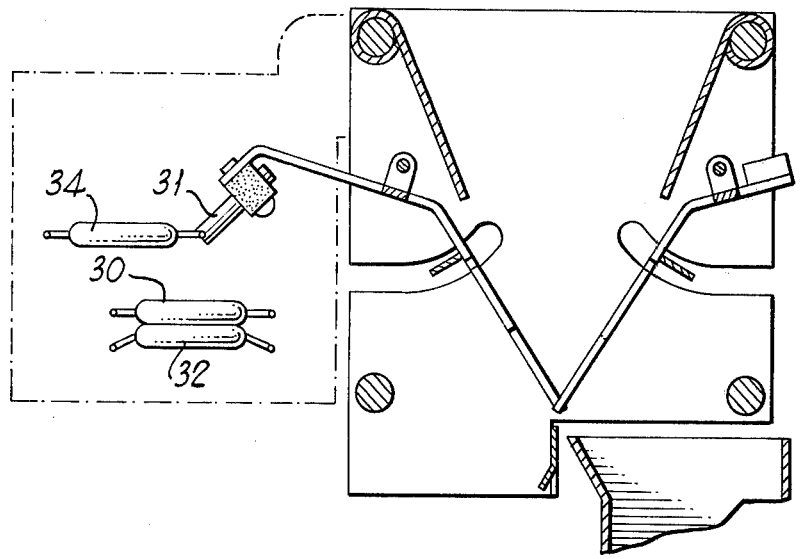
FIG. 11 is a front view of the coin escrow unit and coin detecting mechanism utilized in the paystation.

When one or more coins are deposited into the escrow unit, the reed switch 34 is operated to a closed position by the magnet 31 (FIG. 11), and the reed switches 30 and 32 are returned to an open condition. This switching action is accomplished mechanically by the weight of the coins in the escrow unit. The closing of the reed switch 34 grounds the junction of the collector of the transistor 36, the dial pulse contacts 24 and the inductor 14 through a diode 40, an inductor 42 and a transistor 44 which, in this embodiment, limits the flow of ground current to approximately 20 milliamperes. The closing of the ground circuit path causes an unbalanced current to flow into the lines L1 and L2, and thus indicates to the central office that money has been deposited into the escrow. The opening of the reed switch 32 permits the transistor 36 to be rendered conductive, thus preventing dial pulses from being applied to the lines until the transistor 36 has been rendered nonconductive by the coin tone generator 26 after the required amount of money has been deposited. This is accomplished by rendering a transistor 46 conductive. The conductive transistor 46 connects the base of the transistor 36 to the line L1 through a diode 48. This renders the transistor 36 nonconductive and disconnects a resistor 50 and a diode 52 from across the dial pulse contacts 24. Under these conditions, dial pulses from the dial pulse contacts 24 may be applied to the lines, and be accepted by the central office which has been conditioned to accept them by the unbalanced line current resulting from the closure of the reed switch 34.

The dial pulses passed to the central office will cause the central office to ring the distant station. If the distant station does not answer, and the handset is hung up, minus battery current is sent out by the central office to the paystation along the line L2. This causes a negative voltage to appear at the junction of the inductor 42 and the emitter of a transistor 54. This in turn causes base current to flow from the ground line through a diode 56, a resistor 58, the base-to-emitter junction of a transistor 60 and a pair of diodes 62 and 64 to the junction of the inductor 42 and the emitter of the transistor 54. Such base current flow will render the transistor 60 conductive and cause current to flow from ground through a return relay 66 (also shown in FIG. 4), the collector-to-emitter terminals of the transistor 60 and the diodes 62 and 64 to the junction of the inductor 42 and the emitter of the transistor 44. The current flowing through the return relay 66 will cause the coin or coins in the escrow unit to be returned. Simultaneously, the transistor 54 is rendered conductive in order to render the transistor 44 nonconductive and block the flow of current through the inductor 42 so that all of the current from the line L1 will flow through the return relay 66.

If the called party answers before the paystation hangs up, the coin is collected through the application of a positive battery voltage to the line L2 by the central office. This causes current to flow from the line L2, through the transmitter circuitry, the reed switch 34, a pair of diodes 68 and 70 and a collect relay 72 to ground. After the coins in the escrow unit have been collected or returned, the reed switch 34 is returned to its open position, and the reed switches 30 and 32 are returned to the normally open positions to condition the paystation for the next telephone call.

If the attempted phone call is a long distance call, the central office transfers the call to an operator who notifies the calling party of the amount of money that must be deposited. The additional coins deposited are sensed by the coin tone generator 26 which generates a single tone burst for each nickel deposited, two tone bursts for each dime deposited and three tone bursts for each quarter. The operator listens to the bursts generated by the coin tone generator and permits the call to go through after the required amount of money has been deposited. Subsequent handling of the long distance call is similar to that of a local call with the return relay being activated upon going off hook if the called party does not answer and the collect relay being activated if the called party does answer.

Thus, there is provided an automatic full prepay system wherein the counting of the coins and establishment of the toll for local calls is accomplished by circuitry internal to the paystation, but which still permits emergency calls to pass without the deposit of any coins. Consequently, automatic operation is achieved without the use of special equipment at the central office.

In accordance with another important aspect of the invention, there is provided an improved high security coin box 100 (FIGS. 1 and 3) within the telephone 10. The coin box 100 has an aperture 102 for receiving coins, and a door 104 for preventing unauthorized removal of the coins (FIG. 10). The door 104 is normally positioned in the closed position as illustrated in FIG. 10. When an empty coin box is inserted into the telephone, a pin 106 enters an aperture 108 formed on the rear surface of the coin box and engages a downwardly extending lip 110 of the door 104, thus causing the door to open. The open door then is positioned in communication with the coin escrow unit and receives all collected coins.

At periodic intervals, the coin boxes are changed with the full or partially full coin box being replaced with empty coin boxes. The full coin boxes are then taken to a central agency such as a bank to be opened and the money counted and credited to the telephone company's account.

When one of the coin boxes is removed from the telephone, the pin 106 is withdrawn from the aperture 108, thus allowing the door 104 to close. When the door 104 closes, under the biasing force of the pair of springs 112 and 114 a pawl 116 is pivoted from the position shown in FIGS. 4 and 5 to the position shown in FIGS. 8 and 9 by a spring 118. A projection 120 of the pawl 116 then engages a U-shaped channel member 122 attached to the door 104, and prevents the door from being opened again by the person making the collection or other unauthorized personnel. The coin box is then taken to the central collection agency, opened by breaking the seal on a sealed door latch 124, and the coins are removed. After the coins have been removed, the pawl 116 is reset to the position shown in FIGS. 5 and 6 by rotating a knob 126 affixed to the pawl 116 and extending into the coin box. The cover of the coin box is then replaced and the latch 124 is resealed to permit the box to be installed in another telephone.

In accordance with an important aspect of the present invention, a flag 130 is interposed between the lip 110 and the rear wall of the coin box to prevent the door latching mechanism from being defeated. Without the flag 130, the system could be defeated by taping or otherwise propping the door open prior to inserting the coin box into the telephone. For example, without the flag 130, if the door 104 were manually opened, for example, by inserting a pin into the aperture 108 and retained open by a prop, tape or other means prior to being installed in the telephone, the door 104 would remain open when the box was subsequently removed from the telephone. The service man could then remove some of the coins from the coin box, remove the prop or tape, and allow the door 104 to close. He would then return the partially full coin box to the bank without being detected and pocket the difference.

In order to prevent such theft, the flag 130 is slidingly mounted between the lip 110 and the rear wall of the coin box and biased by a biasing spring 132 in a direction tending to close the aperture 108. Under normal conditions, the flag 130 is retained against the force of the biasing spring 132 in the position shown in FIG. 8 by a second lip 134 extending from the door 104. When the coin box is inserted into the telephone, the door 104 is pushed back against the force of the springs 112 and 114. This releases the flag 130. However, the flag 130 is now maintained in position by the pin 106 which engages a vertically extending portion of the flag 130.

When the coin box is removed, the flag is maintained in position by the pin 106 until the door is returned to its closed position by the springs 112 and 114, at which point the door serves again to maintain the flag 130 in position.

However, if one attempts to open the door manually prior to inserting the coin box into the telephone, the flag 130 will be urged to the position illustrated in FIGS. 9 and 10 by the spring 132. This will cause the flag 130 to block the aperture 108 (FIG. 10), and prevent the coin box from being installed in the telephone. If the door 104 is then allowed to close, the flag 130 is retained in the position shown in FIG. 10 by the lip 134. Thus, the coin box cannot be installed in the telephone and the door 104 cannot be opened; and when such a coin box is returned to the bank for processing, the position of the flag 130 will indicate the tampering, particularly if the flag 130 is made a different color than the coin box. The flag 130 may be reset at the bank by opening the coin box 100, rotating the knob 126 to permit the door 104 to be opened, opening the door 104 by inserting a pin through an aperture 136 in order to release the flag 130, engaging the flag 130 by means of a second pin inserted into an aperture 138 (FIG. 7), moving the flag against the force of the biasing spring 132 and allowing the door 104 to close. Resetting the knob 126 again and closing and sealing the coin box conditions the coin box for further use.

The paystation 10 has a front door 140 that is retained in a closed position by a threaded stud 142 (FIG. 3) that engages an internally threaded rod 144. The stud 142 is rotatable with a key (not shown) that may be inserted into a keyslot 145 (FIG. 16). This permits the stud 142 to be unscrewed from the internally threaded rod 144 by simply turning the key.

In accordance with another important aspect of the invention, in order further to reduce the possibility of tampering and theft, a cap 146 is mounted over the keyhole 145. The cover 146 is retained in position by a threaded collar 148. The cover 146 is intended to protect the locking mechanism from tampering, and consequently, the cover 146 has been designed to make it difficult to remove without the proper tool. Toward this end, the cover 146 has been made frustoconical in shape in order to make it difficult to grip the walls of the cover 146 with a wrench, pliers or the like. Moreover, the threads 148 and the mating threads within the cover 146 are lefthand threads, rather than the conventional righthand threads in order further to confuse potential tamperers. Finally, no screwdriver slots or flat surfaces that can be gripped or otherwise engaged are provided.

The cover 146 has been provided with a shallow chamber 150 on the front surface of the cover 146 to permit the cover to be removed with a special tool. The chamber 150 has sloping walls and a larger diameter at the bottom of the chamber than at the chamber mouth. The walls of the chamber 150 are designed to be gripped by a gripping tool 152 which utilizes a slotted tubular member 154 having four gripping fingers 156, 158, 160 and 162 having surfaces substantially parallel to the walls of the chamber 150. A central rod 164 having a gradually increasing diameter end section is utilized to expand the gripping members 156, 158, 160 and 162 to cause the members to engage the walls of the chamber 150. Two knobs 166 and 168 are provided to control the expansion of the gripping members and to turn the cap 146.

In order to remove the cap, the knobs 166 and 168 are rotated with respect to each other to extend the central shaft 164 to the position illustrated in FIGS. 12 and 14. The central tubular section 154 is affixed to the knob 166 and has an internally threaded end section 170. The central shaft 164 has a threaded section 172 and is affixed to the knob 168. Thus, by turning the knobs 166 and 168 with respect to each other to the position shown in FIGS. 12 and 14, the rod 164 may be extended.

After the rod 164 has been extended, the device 152 is inserted into the chamber 150 and the knob 168 is turned in a clockwise direction (in this embodiment) in order to retract the central rod 164 to the position shown in FIG. 15. In so doing, the enlarged section of the central rod 164 is brought into contact with the gripping members 156, 158, 160 and 162, and causes the gripping members to expand and to contact the walls of the chamber 150. The knob 168 is tightened until a firm grip is obtained between the gripping members and the walls of the chamber 150. The knob 166 is turned in a clockwise direction to remove the cap 146 from the threaded collar 148 (FIG. 16). This permits access to the keyhole 145 and allows the door 140 to be opened by inserting a key in the keyhole 145 and rotating the key a sufficient number of turns to unscrew the stud 142 from the threaded rod 144. Locking of the paystation telephone 10 is accomplished by reversing the sequence of events described above.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A full prepay paystation usable in conjunction with a telephone line pair comprising:
   a dialing signal producing device;
   a voice signal transmitter;
   a coin escrow unit having an escrow mode of operation and collect and return modes of operation, said escrow unit including a coin retaining member biased to a first position and operable to a second position upon the deposit of a coin in the escrow unit;
   switching means responsive to the position of said coin retaining member and electrically coupled to said dialing signal producing device and to said voice signal transmitter for applying dialing signals from said dialing signal producing device and voice signals from said voice signal transmitter to said telephone line when said coin retaining member is positioned in said first position and for preventing the application of said dialing signal and said voice signals to said telephone line when said coin retaining member is positioned in said second position; and
   coin counting means electrically coupled to said switching means for rendering said switching means operative to apply signals from said voice signal transmitter and said dialing signal producing means to said telephone line upon the deposit of a predetermined amount of money in said escrow unit when said coin retaining member is in said second position.

2. A full prepay paystation as recited in claim 1 further including means responsive to a first polarity voltage on one of said telephone lines for operating said coin escrow unit into the collect mode.

3. A full prepay paystation as recited in claim 2 further including means responsive to a second polarity voltage on said one telephone line for operating said coin escrow unit to said return mode.

4. A full prepay paystation as recited in claim 1 wherein said switching means includes means for establishing an electrical connection to ground for unbalancing the current flowing in said telephone line pair upon the operation of said coin retaining means to said second position.

5. A full prepay paystation as recited in claim 1 wherein said switching means includes a plurality of magnetically actuated reed switches and said coin retaining member has a magnet affixed thereto, said magnet being movable with respect to said reed switches upon movement of said coin retaining member and operative to close one of said switches when said coin retaining member is positioned in said first position and operative to close another one of said reed switches when said coin retaining member is positioned in said second position.

6. A security coin box for a paystation telephone having a protrusion extending therefrom comprising:
   a coin container having a coin receiving opening and a door having an open and a closed position disposed over said opening;
   an aperture within said container for receiving said protrusion upon installation of said coin box within said telephone;
   door operating means engageable by said protrusion for opening said door upon the installation of said coin box in said telephone, said door operating means including means for automatically closing and locking said door upon removal of said coin box from said telephone; and
   means for automatically blocking said aperture to prevent the entry of said protrusion into said aperture upon the opening of said door without simultaneous insertion of said protrusion into said aperture to thereby prevent the installation of said coin box in said telephone if said door has been manually opened.

7. A security coin box as recited in claim 6 wherein said blocking means includes a plate slidingly mounted within said container adjacent to said aperture and resilient biasing means biased for urging said plate in a direction to block said aperture.

8. A security coin box as recited in claim 7 wherein said door and said plate include cooperating means for retaining said plate against the force of said biasing means to maintain said aperture in an unblocked condition when said door is in a closed position.

9. A security coin box as recited in claim 8 wherein said resilient biasing means serves to move said plate to an aperture blocking position when said door is manually opened and said cooperating means include means for retaining said plate in the aperture blocking position upon subsequent closure of said door.

10. A security coin box as recited in claim 9 wherein said plate is a different color than said container.

11. A security coin box as recited in claim 9 wherein said plate includes means for engaging said protrusion and retaining said plate against the force of said biasing means to maintain said aperture in an unblocked position when said protrusion is inserted into said aperture.

* * * * *